Dec. 15, 1931.   E. C. HEAD   1,836,662

CUTTER TRUING DEVICE

Filed Jan. 22, 1929

INVENTOR
ERNEST C. HEAD
BY *B. Schlesinger*
ATTORNEY

Patented Dec. 15, 1931

1,836,662

UNITED STATES PATENT OFFICE

ERNEST C. HEAD, OF ROCHESTER, NEW YORK, ASSIGNOR TO GLEASON WORKS, OF ROCHESTER, NEW YORK, A CORPORATION OF NEW YORK

CUTTER TRUING DEVICE

Application filed January 22, 1929. Serial No. 334,303.

The present invention relates to testing apparatus and particularly to apparatus for testing the settings of face mill cutter blades.

The primary object of this invention is to provide a simple and efficient device for quickly testing the radial setting of the blades of a face mill gear cutter to permit of rapidly truing the blades to a predetermined radial setting.

A further object of this invention is to provide means whereby a single indicator may be employed for testing the accuracy of the radial settings of both the inside and outside cutting blades.

In conjunction with the device for testing the radial settings of the blades, there is provided, also, a device for testing the height settings of the blades, with the purpose of providing an instrument on which the blades of a face mill cutter can be accurately adjusted to the precision required in the cutting of gear teeth.

Other objects of the invention will be apparent hereinafter from the specification and from the recital of the appended claims.

Figure 1:
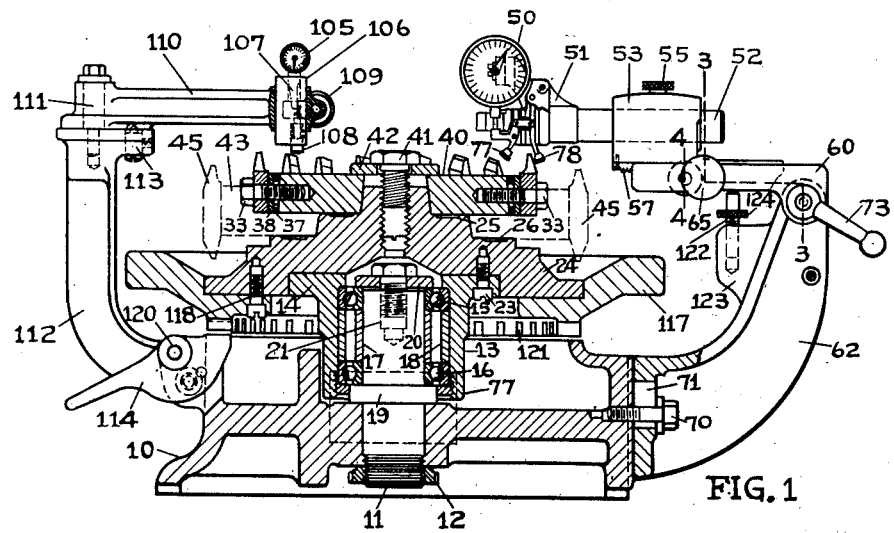
Figure 1 is a vertical sectional view of a cutter truing device constructed according to one embodiment of this invention for testing the settings of the blades of a rotary annular face mill gear cutter.

Referring to the drawings by numerals of reference, 10 indicates the base of my cutter truing device and 11 a stud mounted in a socket bored centrally of the base and secured in said socket by the nut 12.

Rotatably mounted upon the stud 11 is a sleeve 13 having a flanged upper end 14. Anti-friction bearings 15 and 16 are interposed between the sleeve 13 and the stud 11 so that the sleeve and the parts supported thereby can be easily and quickly rotated upon the stud. The bearings 15 and 16 are held in spaced relation axially of the stud by means of the ring members 17 and 18. The lower bearing 16 rests upon a shoulder 19 formed on the stud 11 intermediate its length and the bearings 15 and 16 and the rings 17 and 18 are clamped in position on the stud by the washer 20 which engages the upper bearing 15 and the bolt 21 which clamps said washer to the stud. By means of the washer 20 and bolt 21 the bearings 15 and 16 are put under sufficient pressure to take out any appreciable axial or radial play in the sleeve 13.

Secured to the flange 14 of the sleeve 13, as by means of screws 23, is a support 24 on which the cutter head to be tested and trued is mounted.

Face mill cutter heads are made in various diameters and for this reason the cutter head support 24 is constructed to provide a pair of rests or steps 25 and 26 on which cutters of different diameters may be supported for the purpose of testing and truing them.

Figure 5:
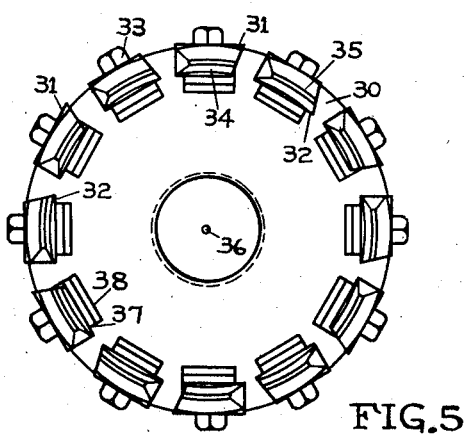
Figure 5 is a plan view of a face mill cutter head such as the device of the present invention is intended to test.

A typical face mill cutter is shown in plan in Figure 5, at 30. Such a cutter is provided with a plurality of cutting blades of which alternate blades 31 and 32 are constructed to cut, respectively, opposite side tooth faces of a gear. As shown, the blades 31 are provided with outside cutting edges and the blades 32 with inside cutting edges. The blades are secured in recesses in the gear cutter head by means of bolts 33. Two of the blades, as 34 and 35, are ordinarily regarded as master blades and are fixedly secured in the cutter head by their respective bolts 33. The remaining blades are adjustable radially of the axis 36 of the cutter head. They can be adjusted by sliding the wedges 37 on the shims 38. These are clearly shown in Figures 1 and 5, a pair being provided for each cutting blade. In the case of the blades 34 and 35, the wedges are provided to permit of initially setting these blades to their correct radial positions, but when once set, the wedges and shims are secured in any suitable manner against adjustment.

Truing up of a face mill cutter consists of adjusting all of the adjustable blades to the same radial position as the fixed master blades 34 and 35. It is for the purpose of permitting this adjustment to be made rapidly and efficiently that the apparatus of the present invention has been devised.

Figure 1 shows in full lines one size of face mill cutter and in dotted lines a face mill cutter of a larger diameter. The smaller cutter 40 is clamped securely on the rest or seat 25 of the cutter head support 24 by means of the bolt 41 and the washer 42. Because of its larger diameter, it is preferable to clamp a larger cutter, such as shown in dotted lines at 43, upon the seat 26 which is of larger diameter and which will provide a more secure rest for such a cutter. This larger diameter cutter 43 is shown as provided with double-ended cutting blades 45 as either a cutter provided with single or double-ended blades may be tested upon the present device.

For testing the radial position of the cutter blades, a radial testing gage 50 is provided. This is secured in any suitable manner to a support 51 which is formed with a cylindrical stud or shaft 52. The stud 52 is adapted to be received in and clamped in a split sleeve 53 by means of a bolt 54 and a knurled nut 55. The split sleeve member 53 is provided with a dove-tailed foot portion 56 which is provided on its lower face with rack teeth 57.

Figure 4:
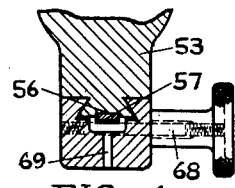
Figure 4 is a section on the line 4—4 of Figure 1 also on an enlarged scale.
Figure 3:
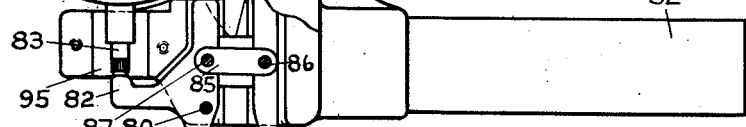
Figure 3 is a section on the line 3—3 of Figure 1 on an enlarged scale.
Figure 3:
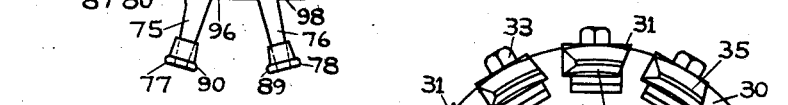
Figure 3:
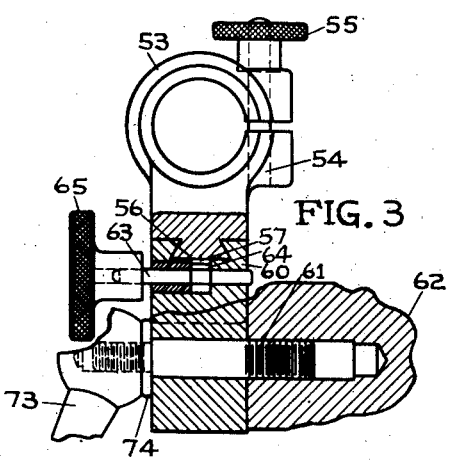

The dove-tailed portion 56 of the sleeve 53 slides in a correspondingly-shaped groove formed in the upper face of a arm 60 which is pivotally adjustable upon a stud 61 that is threaded into a bracket 62. Journaled in the arm 60 is a shaft 63 which carries a pinion 64 that meshes with the rack 57. The shaft 63 can be rotated by the knurled nut 65 to adjust the split sleeve member 53 on the arm 60 radially of the cutter axis. The sleeve 53 can be clamped in any adjusted position by means of the clamping screw 68 (Fig. 4) the arm 60 being split, as shown at 69 to effect a binding action on the dove-tailed foot of the sleeve member 53 when the knurled nut on the screw 68 is threaded up.

The bracket 62, already referred to, is secured to the base 10 of the truing device for adjustment thereon in a direction parallel to the axis of the cutter to be tested by means of a bolt 70 which passes through a slot 71 formed in the end face of the bracket 62. As stated, the arm 60 is angularly adjustable upon this bracket and it may be secured in any position of adjustment thereon by means of the clamp lever 73 and washer 74, the former being threaded upon the pivot stud 61.

The support 51 carries in addition to the indicator 50, which may be of any suitable type, a pair of fingers 75 and 76. These fingers 75 and 76 are provided, respectively, with contact points or tips 77 and 78, adapted to engage, respectively, the cutting edges of the oppositely disposed blades 32 and 31 of the cutter head. The finger 75 which is of general Y-shape is pivotally mounted at 80 upon the support 51 and is provided with an arm 82, the tip of which engages the spring plunger 83 of the indicator gage 50. The arm 76 is pivotally mounted at 84 upon the support 51. The two fingers 75 and 76 are connected for movement together by means of a link 85 which is pivotally connected at 86 with the finger 76 and at 87 with the finger 75.

The positions of the pivot points 80, 87, 86 and 84 are selected relative to one another so that any movement of either finger 75 or finger 76 caused by the deviation of a cutter blade from its predetermined radial setting, as fixed by the position of the master blade, will be transmitted in the correct proportion to the indicator 50 to be correctly indicated thereon. To this end, the link 85 is pivoted to the finger 76 at a point 86 which is exactly half-way the distance between the point 89 of the contact tip 78 which engages the cutting edge and the point 84 on which the finger 76 is pivoted. To this end, also, the finger 75 is pivoted at 80 at a point which is equi-distance from the contact point 82 which engages the plunger 83 and the point 90 of the contact tip 77 which engages the cutter blade. To this end, also, the link 85 is pivotally connected at 87 to the finger 75 so that the point 87 is removed from the point 80 a distance equal to half the distance between the point 80 and the contact point 82. As will be seen from this arrangement, any movement of the finger 75 caused by a deviation of an inside blade 32 from its correct radial setting will be transmitted directly to the indicator 50 through the plunger 83 and contact point 82 without change. In like manner, any movement of the finger 76 caused by a variation in the setting of an outside blade 71 from its correct radial position will be transmitted through the link 85 and the finger 75 to the indicator without change, because the distance of the pivot point 87 of the link 85 from the pivot point 80 of the finger 75 is equal to half the distance between the pivot point 80 and either the contact point 82 or the point 90 of the contact tip 82.

Figure 2:
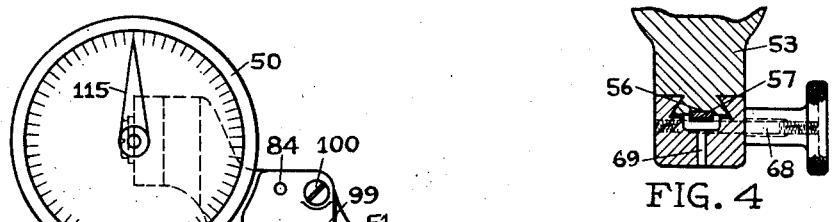
Figure 2 is a side elevation with parts broken away, of the radial testing gage, the fingers for actuating the same, and of the support on which both are mounted.

The support 51 is recessed at 95, 96, 97 and 98 to provide working spaces for the plunger 83, finger 75, link 85 and finger 76, respectively, and these parts are housed in the spaces so provided by a cover-plate 99 which is shown broken away in Figures 1 and 2 and which is secured to the support 51 by screws 100.

In addition to the radial testing gage, provision is made in the present apparatus for testing the height of the cutter blades in order that they may be adjusted to the predetermined height fixed by the setting of the master blades 34 and 35. The height gage is shown at 105. It is mounted upon a cylindrical piece 106 which is bored to receive the contact point 107 and the spring pressed plunger 108 which actuates the gage. The cylindrical piece 106 can be clamped at a proper height above the cutter head by the screw 109 which clamps the split end of the arm 110 about this cylindrical piece.

The arm 110 is mounted for pivotal movement upon a stud 111 which is secured in a bracket 112 that is suitably fastened to the base 10. By reason of its pivotal mounting, the gage 105 can be swung to any desired position to test cutters of different diameters. A spring pressed plunger 113 which is provided with a beveled upper end and is housed in the bracket 112 and which is adapted to enter one of a series of notches provided in the arm 110 serves to secure this arm in any of its positions of adjustment.

The point of the plunger 108 is adapted to contact the tips of the cutter blades with the result that the indicator 105 will indicate any deviation in the setting of any blade from the correct height setting.

In operation, the cutter to be trued is placed upon the rest 25 or 26 depending upon its diameter and is secured in position on the support 24 by means of the bolt 41 and washer 42. The bracket 62 is set to a convenient height to bring the contact fingers 75 and 76 to a suitable position for testing the radial positions of the cutter blades and is secured in its adjusted position by means of the bolt 70. The clamping screw 55 is loosened up to permit adjustment of the post 52 of the support 51 in this sleeve 53 to roughly position the fingers 75 and 76 according to the diameter of the cutter to be tested. The screw 55 is then again tightened. A finer radial adjustment of the fingers 75 and 76 can be secured by rotating the knurled nut 65 to rotate the pinion 64 which engages the rack 57 on the sleeve member 53. This is for the purpose of setting the fingers 75 and 76 more closely to the desired radial setting to avoid too great a movement of the mechanism of the indicating instrument 50 which might eventually damage the instrument or affect its accuracy. A fine height adjustment can be obtained, also, by pivotal adjustment of the arm 60 on the bracket 52. After this latter adjustment has been effected, the arm 60 will again be secured in adjusted position by moving the hand lever 73 in the correct direction.

To position the height gage 150, the arm 110 is swung by hand to bring the gage to the proper radial position, the notches in the arm 110 ratcheting over the spring pin 113 in this adjustment. The height of the gage is adjusted by adjusting the cylindrical piece 106 in the split sleeve portion of the arm 110 and securing the cylindrical piece in its adjusted position by clamping the split sleeve about this piece again by means of the screw 109.

Having adjusted the contact fingers as described, the cutter head 24 is rotated to bring one of the blades into position where its cutting edges will be engaged by either the finger 78 or the finger 77. If this blade does not have the correct radial position, the finger 75 or 76, as the case may be is rocked about its pivot and the amount of deviation from the correct radial position is indicated on the dial of the instrument 50 by the hand 115. If the blade does not have the correct radial position, the bolt 33 which secures that blade to the cutter head is loosened and the wedges or shims 37 and 38 adjusted to bring the blades to the correct radial position and the blade secured in this position by the bolt 33. For the purpose of holding the blade in engagement with the finger 75 or 76 as the case may be, during this adjustment, an annular member 117 is secured to the cutter head support 24 by means of screws 118. This member 117 is provided with radial notches 121 on its lower face. A locking dog 119 which is pivoted at 120 on the base 10 can be engaged with one of these notches 121 to hold the cutter head support against rotation during adjustment of each blade.

To prevent the indicator setting from being disturbed when the blades are tapped with a hammer during the truing process it has been found desirable to put the arm 60 under a slight pressure after it has been adjusted into position and clamped by the lever 73. This pressure can be secured by threading up the thumb screw 122 slightly to put a small amount of pressure on the arm 60. This thumb screw 122 threads into a lug 123 formed integral with the bracket 62 and can be rotated by the knurled flange 124.

In the testing of a finishing cutter, the height gage permits of checking the height adjustment of the blades and their seating. This gage is especially useful in truing up roughing cutters as it gives a quick approximate test of the radial setting of a blade.

When one of these blades has been adjusted properly, the ring 117 is unlocked by disengaging the dog 119 from the notch 121 of the ring and the cutter head is rotated by hand to bring another blade into position to be tested. Ordinarily, it is preferred to test all of the outside or all of the inside blades with the finger 76 or the finger 75, as the case may be, adjusted to the most convenient position for testing these blades and then re-adjust the support 51 to bring the other finger into convenient position for testing the remaining blades.

As face mill cutter blades must be set to an accuracy measured in ten thousandths of an inch, it is desirable to secure only a point contact between the tips 77 and 78 of the test fingers 75 and 76 and the cutting edges being tested that a reading of the highest accuracy may be obtained. For this purpose the contact tips 77 and 78 are made round and are, also, rotatably adjustable on their respective fingers so that when wear at one point produces a flat surface on a tip, the tip can be rotated on its finger to bring the rounded surface again in position to make point contact only with the blades.

It will be understood, of course, that this invention is not confined to the use of any particular form of indicating mechanism and that instead of dial indicators as shown, any other suitable form of indicating device may be employed. In general, it may be said that while I have illustrated and described a certain preferred embodiment of my invention, it will be understood that the invention is capable of further modification and use and that this application is intended to cover any variations, uses, or adaptations of my invention following, in general, the principles of the invention and including such departures from the present disclosure as come within known or customary practise in the gear art and as may be applied to the essential features hereinbefore set forth and as fall within the scope of the invention or the limits of the appended claims.

Having thus described my invention, what I claim is:

1. A testing device comprising a support, an indicating device having a movable contact member mounted on said support, a contact finger constructed with a tip adapted to engage an object to be tested and with a portion adapted to engage the movable contact member of said indicating device to actuate said indicating device on movement of said finger, said finger being pivotally mounted on said support with its pivot point equidistant from its tip and the point of its engagement with the contact member of the indicating device, a second contact finger pivotally mounted on said support, a link connecting the two fingers pivotally connected to the second finger at a point equidistant between its pivot and its tip and pivotally connected to the first finger at a point which is half as far from the pivot of said finger as the pivot of said finger is from its contact point whereby any movement of the second finger is communicated in the same degree to the first finger and either of the fingers may be used for testing purposes.

2. In apparatus for testing face mill gear cutters, a rotatable cutter support adapted to carry a cutter to be tested, a base on which the cutter support is rotatable, a pair of movable contact fingers adapted to be engaged selectively with the blades of the cutter to be tested, means for adjusting said contact fingers radially of the axis of the cutter support to position one or the other of the contact fingers in testing position, an indicating device, means whereby movement of one finger is registered directly on the indicating device, and means connecting the other finger to the first so that movement of the second finger causes a movement of the first.

3. In apparatus for testing face mill gear cutters, having alternate inside and outside cutting blades, a rotatable cutter support adapted to carry a cutter to be tested, a base on which the cutter support is rotatable, a pair of movable contact fingers adapted to be engaged, selectively, with the opposite side cutting blades of a cutter to be tested, a carrier on which both said contact fingers are mounted, said carrier being adjustable radially of the axis of the cutter support to position one or the other of the contact fingers in testing position, an indicating device, and means connecting the two fingers with said indicating device whereby a movement of either finger is communicated to said indicating device in the same degree as a corresponding movement of the other finger.

4. In apparatus for testing face mill gear cutters, a base, a cutter support adapted to carry a cutter to be tested journaled on said base in anti-friction bearings, said cutter support being rotatable on the base to bring successive blades of the cutter into testing position, means for locking the cutter support in any position of its rotatable adjustment, a pair of movable contact fingers adapted to be engaged selectively with the blades of the cutter to be tested, means for adjusting said contact fingers radially of the axis of the cutter support to position one or the other of said contact fingers in testing position, an indicating device, and means connecting the two fingers with said indicating device whereby a movement of either finger is communicated to said indicating device in the same degree as a corresponding movement of the other finger.

5. In apparatus for testing face mill gear cutters, a base, a rotatable cutter support mounted on said base and adapted to carry the cutter to be tested, a pair of contact fingers adapted to be engaged selectively with the blades of said cutter, a carrier on which said fingers are pivotally mounted, said carrier being adjustable radially of the axis of said cutter support to bring either of said contact fingers into testing position, an indicating device mounted on said carrier and having a movable contact member adapted to be operated by one of said fingers, said fingers being so arranged with reference to the indicating device that the pivot point of one finger is equidistant its tip and the point at which it engages the contact member of the indicating device, and a link connecting the two fingers, said link being pivotally connected to the second finger at a point equidistant the tip of the second finger and the point of pivotal connection of the second finger with the carrier, and being pivotally connected to the first finger at a point which is half as far from the pivot of said first finger as the pivot of said first finger is from it contact point.

6. In apparatus for testing face mill gear cutters, a base, a rotatable cutter support mounted on the base and adapted to carry the cutter to be tested, a pair of contact fingers adapted to be engaged selectively with the blades of the cutter to be tested, an arm, a carrier on which the contact fingers are movably mounted, said carrier being adjustable on said arm in a direction radial of the axis of the cutter support to bring either of said contact fingers into testing position, an indicating device mounted on said carrier, means whereby movement of one finger is registered directly on said indicating device, means connecting the other finger to the first so that movement of the second finger causes a movement of the first, a bracket extending from said base, said arm being angularly adjustable on said bracket to bring the contact fingers into the correct testing plane, means for locking the arm against movement after it has been adjusted, and auxiliary means for preventing movement of said arm after it has been locked in position.

ERNEST C. HEAD.